United States Patent
Armitage et al.

(10) Patent No.: US 9,086,129 B2
(45) Date of Patent: Jul. 21, 2015

(54) SHIFT LEVER ASSEMBLY WITH AXIALLY OFFSET NOISE AND VIBRATION DAMPER

(75) Inventors: Douglas P. Armitage, Knoxville, TN (US); Michael A. Kidd, Northwood, OH (US)

(73) Assignee: TREMEC Corporation, Plymouth, MI (US)

( * ) Notice: Subject to any disclaimer, the term of this patent is extended or adjusted under 35 U.S.C. 154(b) by 594 days.

(21) Appl. No.: 12/622,528

(22) Filed: Nov. 20, 2009

(65) Prior Publication Data

US 2010/0122600 A1    May 20, 2010

Related U.S. Application Data

(60) Provisional application No. 61/116,460, filed on Nov. 20, 2009.

(51) Int. Cl.
*F16H 59/02* (2006.01)
*F16H 59/04* (2006.01)

(52) U.S. Cl.
CPC ........ *F16H 59/0208* (2013.01); *F16H 59/0278* (2013.01); *F16H 59/04* (2013.01); *Y10T 74/20134* (2015.01)

(58) Field of Classification Search
CPC ..... F16H 59/10; F16H 59/12; F16H 59/0208; F16H 59/0217; F16H 59/04; F16H 59/0278
USPC ............................. 74/473.29, 473.3, 470, 523
See application file for complete search history.

(56) References Cited

U.S. PATENT DOCUMENTS

| | | | | |
|---|---|---|---|---|
| 1,908,423 | A * | 5/1933 | Hjermstad | 403/83 |
| 4,960,009 | A * | 10/1990 | Schultz et al. | 74/473.29 |
| 5,579,661 | A * | 12/1996 | Yarnell et al. | 74/473.29 |
| 5,845,534 | A * | 12/1998 | Kim | 74/473.12 |
| 6,360,627 | B1 * | 3/2002 | Buckingham et al. | 74/473.3 |
| 6,513,406 | B1 * | 2/2003 | Murray et al. | 74/523 |
| 6,705,180 | B2 * | 3/2004 | Arakawa et al. | 74/523 |
| 7,296,493 | B2 | 11/2007 | Buckingham et al. | |
| 7,395,732 | B2 * | 7/2008 | Hartleip et al. | 74/473.29 |
| 7,886,628 | B2 * | 2/2011 | Burns, Sr. | 74/473.29 |
| 2002/0124675 | A1 * | 9/2002 | Hashimoto et al. | 74/473.29 |
| 2005/0022622 | A1 * | 2/2005 | Mitteer | 74/473.3 |
| 2006/0021459 | A1 * | 2/2006 | Buckingham et al. | 74/473.29 |
| 2008/0163715 | A1 | 7/2008 | Burns | |
| 2009/0007712 | A1 * | 1/2009 | Laming et al. | 74/473.3 |
| 2010/0139443 | A1 * | 6/2010 | Choi et al. | 74/502.5 |
| 2011/0056325 | A1 * | 3/2011 | Cho et al. | 74/502.4 |
| 2011/0132127 | A1 * | 6/2011 | Burns, Sr. | 74/473.29 |
| 2012/0037311 | A1 * | 2/2012 | Burns, Sr. | 156/285 |

* cited by examiner

*Primary Examiner* — William Kelleher
*Assistant Examiner* — Zakaria Elahmadi
(74) *Attorney, Agent, or Firm* — MacMillan, Sobanski & Todd, LLC

(57) ABSTRACT

A shift lever assembly for a manual transmission includes a hollow shift lever having a shift knob provided thereon. A noise and vibration damper includes a hollow housing that is connected to the hollow shift lever, and a damper assembly is provided within the hollow housing of the noise and vibration damper. The damper assembly is adapted to be connected to a control member of a manually operable transmission. A line extends from the shift knob provided on the hollow shift lever and through the interior of the hollow shift lever. The line is adapted to control the operation of the manually operable transmission.

20 Claims, 3 Drawing Sheets

SHIFT LEVER ASSEMBLY WITH AXIALLY OFFSET NOISE AND VIBRATION DAMPER

CROSS-REFERENCE TO RELATED APPLICATIONS

This application claims the benefit of U.S. Provisional Application No. 61/116,460, filed Nov. 20, 2008, the disclosure of which is incorporated herein by reference.

BACKGROUND OF THE INVENTION

This invention relates in general to a shift lever assembly for use with a manually operated transmission. In particular, this invention relates to an improved structure for such a shift lever assembly having a noise and vibration damper that reduces the amount of noise and vibration that is transmitted from the engine and the transmission into the driver compartment, and further that protects and conceals one or more lines that extend from a shift knob supported on an upper end of the shift lever assembly to the transmission.

In most vehicles, a transmission is provided in a drive train between the engine and the driven wheels. As is well known, the transmission includes a plurality of gears that are selectively engaged to provide a plurality of speed reduction gear ratios between an input shaft and an output shaft of the transmission. A control member (such as a stub shaft) is provided within the transmission and is adapted to be moved by a driver of the vehicle throughout a plurality of gear ratio positions for selecting and engaging the desired speed reduction between the input shaft and the output shaft. As a result, acceleration and deceleration of the vehicle can be achieved in a smooth and efficient manner.

In many smaller vehicles, such as automobiles, the transmission functions automatically to move the control member without any intervention by the driver of the vehicle. However, such an automatic transmission is typically not used in larger vehicles, such as trucks, because of the increased size and expense. Such vehicles are, therefore, often provided with a manually operable transmission, where the shifting of the control member is accomplished by physical movement of the control member by the vehicle driver.

In order to shift the control member between the gear ratio positions in a manual transmission, a shift lever assembly is generally provided. A lower end of the shift lever assembly extends downwardly into engagement with an upper end of the control member. The upper end of the shift lever assembly extends upwardly into a drive compartment of the vehicle, where it is convenient for the vehicle driver to grasp and manipulate it. Thus, when the upper end of the shift lever assembly is moved by the vehicle driver, the lower end thereof (as well as the control member connected thereto) are also moved. By properly moving the shift lever assembly, the vehicle driver may position the control member of the transmission to select and engage any one of the plurality of gear ratios for use.

When the vehicle is operated, it has been found that the engine, transmission, and other components of the drive train of the vehicle vibrate to a certain extent. All of such vibrations can be sensed by the vehicle driver as undesirable noise. To reduce the amount of this undesirable noise, the driver compartment of the vehicle is typically lined with an acoustical insulation material. Unfortunately, the shift lever assembly extends upwardly from the transmission into the driver compartment for convenient use. As a result, the shift lever assembly transmits these vibrations into the driver compartment, thereby by largely defeating the purpose of the acoustical insulation material.

To address this, it is known to provide the shift lever assembly with a noise and vibration dampening mechanism. Such noise and vibration dampening mechanisms are designed to reduce the amount of noise and vibration that is transmitted from the engine and transmission through the shift lever assembly to the driver compartment of the vehicle. A typical noise and vibration dampening mechanism includes one or more elastomeric damping members disposed within a cylindrical housing. A lower shift lever member has a lower end that is connected to the upper end of the control member of the transmission and an upper end that is secured to the noise and vibration dampening mechanism. An upper shift lever member has a lower end that is secured to the noise and vibration dampening mechanism. The noise and vibration dampening mechanism thereby provides a mechanical connection between the lower shift lever member and the upper shift lever member, which reduces the amount of noise and vibration that is transmitted from the engine and transmission through the shift lever assembly to the driver compartment of the vehicle.

Although known noise and vibration dampening mechanisms have functioned satisfactorily, there is a need for an improved shift lever assembly having a noise and vibration dampening mechanism that not only reduces the amount of noise and vibration that is transmitted from the engine and the transmission into the driver compartment, but further protects and conceals one or more lines that extend from a shift knob supported on an upper end of the shift lever assembly to the transmission.

SUMMARY OF THE INVENTION

This invention relates to an improved shift lever assembly having a noise and vibration dampening mechanism that reduces the amount of noise and vibration that is transmitted from the engine and the transmission into the driver compartment, and further that protects and conceals one or more lines that extend from a shift knob supported on an upper end of the shift lever assembly to the transmission. The shift lever assembly includes a hollow shift lever having a shift knob provided thereon. A noise and vibration damper includes a hollow housing that is connected to the hollow shift lever. A damper assembly is provided within the hollow housing of the noise and vibration damper. The damper assembly is adapted to be connected to a control member of a manually operable transmission. A line extends from the shift knob provided on the hollow shift lever and through the interior of the hollow shift lever. The line is adapted to control the operation of the manually operable transmission.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
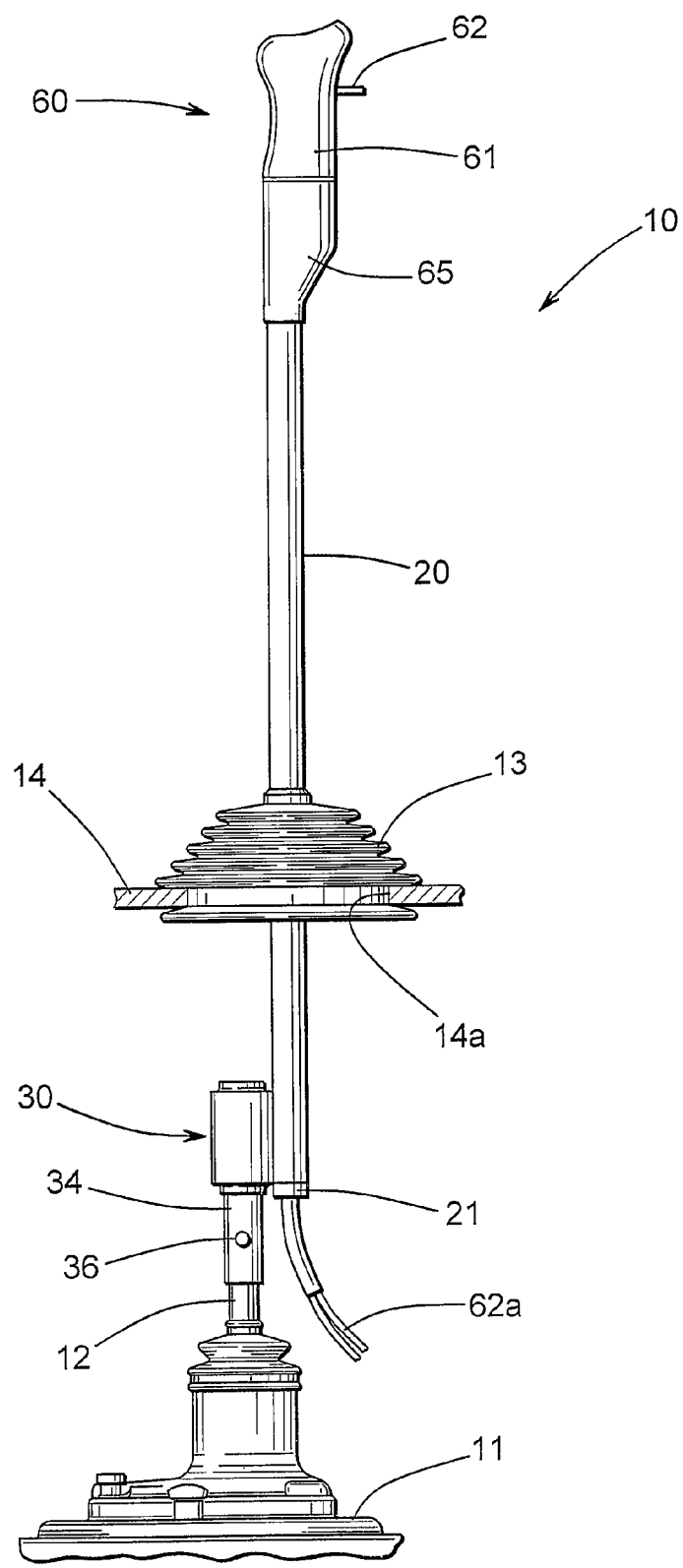
FIG. 1 is a side elevational view of a transmission shift lever assembly in accordance with this invention.

Referring now to the drawings, there is illustrated in FIG. 1 a shift lever assembly, indicated generally at 10, in accordance with this invention. The shift lever assembly 10 is adapted for use with a conventional manually operable transmission 11. As is well known in the art, the transmission 11 includes a plurality of gears (not shown) that are selectively engaged to provide a plurality of speed reduction gear ratios between an input shaft (not shown) and an output shaft (not shown) thereof. In order to select and engage the desired gear ratio, a control member (such as the illustrated shift stub 12) is provided on the transmission 11. In a manner that is well known in the art, movement of the shift stub 12 causes selective engagement and disengagement of the plurality of gears provided within the transmission 11, thereby providing a desired speed reduction gear ratio between the input shaft and the output shaft. The lower end of the shift lever assembly 10 is attached to the shift stub 12 of the transmission 11 so as to provide a mechanical connection therebetween. As a result, movement of the shift lever assembly 10 causes corresponding movement of the shift stub 12 and, consequently, operation of the transmission 11 as described above.

The shift lever assembly 10 includes an elongated shift lever 20. In the illustrated embodiment, the shift lever 20 is a hollow tubular structure that includes an outer surface and an inner surface that defines an enclosed interior. The shift lever 20 extends downwardly through a conventional flexible elastic boot 13 and through an opening 14a formed through a floor 14 of a vehicle into engagement with the shift stub 12 of the transmission. Thus, the floor 14 functions as a divider between a driver compartment of the vehicle (located above the floor 14) and an engine and drive train compartment of the vehicle (located below the floor 14).

Figure 2:
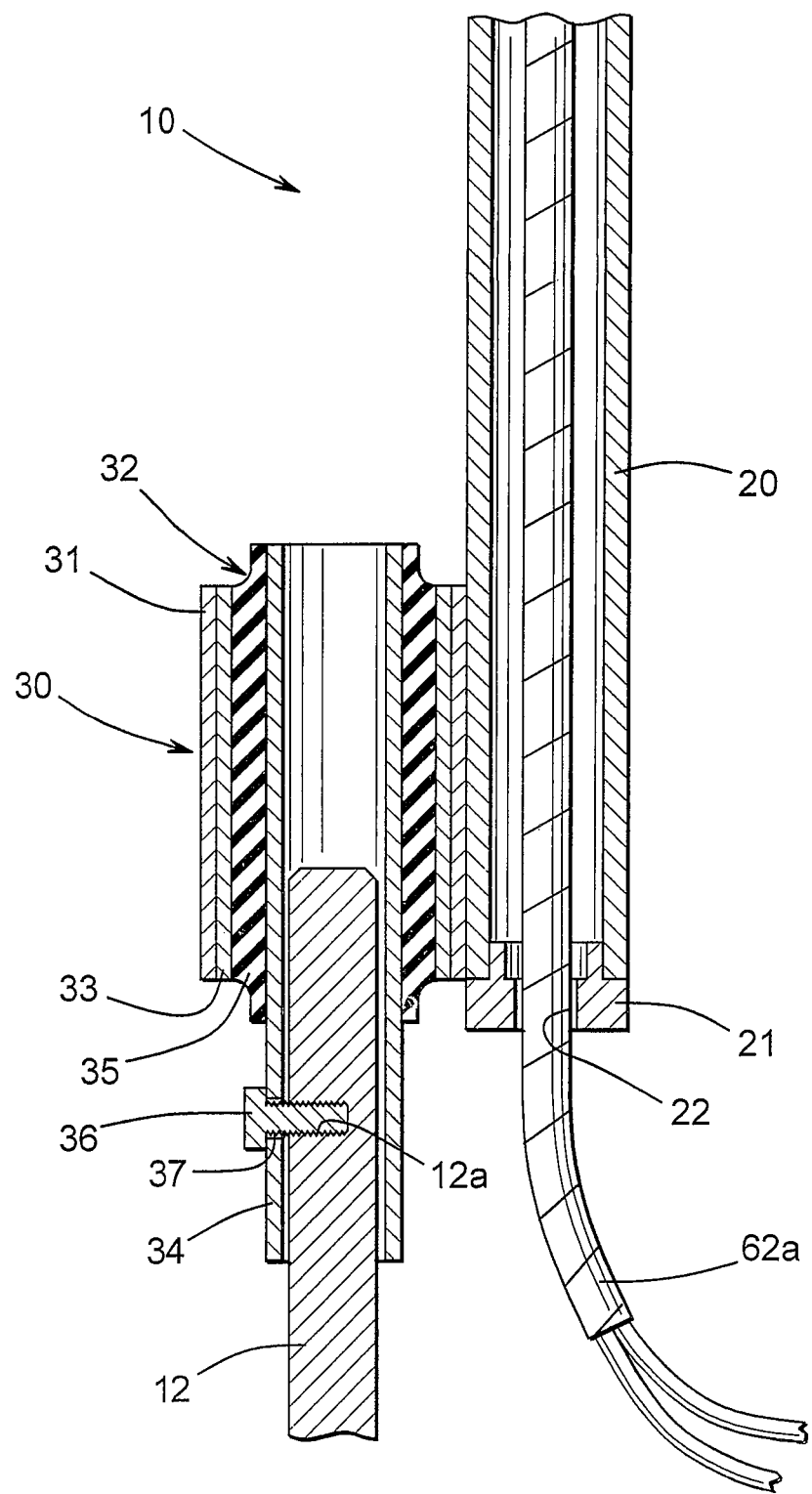
FIG. 2 is an enlarged sectional view of a lower end of the shift lever assembly illustrated in FIG. 1.

As best shown in FIG. 2, the lower end of the illustrated shift lever 20 is closed by a plug 21. The plug 21 is preferably formed from a noise and vibration absorbing material, such as an elastomeric material, for example. However, the plug 21 may be formed from any desired material. The plug 21 may be press fit or otherwise secured to the lower end of the illustrated shift lever 20. The plug 21 has an opening 22 formed therethrough, the purpose of which will be explained below.

Beneath the floor 14, the lower end of the shift lever 20 extends into engagement with a noise and vibration damper assembly, indicated generally at 30. The structure of the noise and vibration damper assembly 30 is illustrated in detail in FIG. 2. As shown therein, the noise and vibration damper assembly 30 includes a hollow housing 31 that includes an outer surface and an inner surface. In the illustrated embodiment, the housing 31 of the noise and vibration damper assembly 30 is a metallic, hollow, and cylindrical member, although such is not required. The outer surface of the housing 31 of the noise and vibration damper assembly 30 is secured to the outer surface of the shift lever 20, such as by welding or any other desired means. Thus, the housing 31 of the noise and vibration damper assembly 30 is secured to the lower end of the shift lever 20 for movement therewith. In the illustrated embodiment, the housing 31 of the noise and vibration damper assembly 30 is axially offset from the lower end of the shift lever 20, although such is not required.

The noise and vibration damper assembly 30 further includes a damper mechanism, indicated generally at 32, that is disposed within the hollow housing 31 thereof. The damper mechanism 32 includes an outer sleeve 33 that is received within and supported on the housing 31 of the noise and vibration damper assembly 30. In the illustrated embodiment, the outer sleeve 33 of the damper mechanism 32 is a metallic, hollow, and cylindrical member that is press fit within the housing 31 of the noise and vibration damper assembly 30. However, the outer sleeve 33 of the damper mechanism 32 may be formed from any desired material and may be secured to the housing 31 of the noise and vibration damper assembly 30 in any desired manner. Alternatively, the outer sleeve 33 of the damper mechanism 32 may be formed integrally with the housing 31 of the noise and vibration damper assembly 30.

The damper mechanism 32 also includes an inner sleeve 34 that is received within and supported on the outer sleeve 33 of the damper mechanism 32. In the illustrated embodiment, the inner sleeve 34 of the damper mechanism 32 is a metallic, hollow, and cylindrical member that is supported on the outer sleeve 33 by means of an annular layer of a noise and vibration absorbing material 35 that is disposed therebetween. The noise and vibration absorbing material 35 is conventional in the art and may be embodied as any desired material (an elastomeric material, for example) that is adhered or otherwise secured to both the inner surface of the outer sleeve 33 and the outer surface of the inner sleeve 34. However, the inner sleeve 34 may be received within and supported on the outer sleeve 33 of the damper mechanism 32 in any other desired manner.

The lower end of the inner sleeve 34 extends downwardly from the damper mechanism 32 beyond the outer sleeve 33 and is connected to the upper end of the shift stub 12 of the transmission 11. As shown in FIG. 2, this connection can be accomplished by means of a cross pin 36 that extends through a hole 37 formed through a portion of the lower end of the inner sleeve 34. Preferably, the cross pin 36 is threaded and extends into threaded engagement with a threaded bore 12a that is provided in the upper end of the shift stub 12 of the transmission 11. However, the inner sleeve 34 can be secured to the shift stub 12 of the transmission 11 by any suitable means. Regardless, the inner sleeve 34 of the damper mechanism 32 is connected to the upper end of the shift stub 12 of the transmission 11 for movement therewith.

Figure 3:
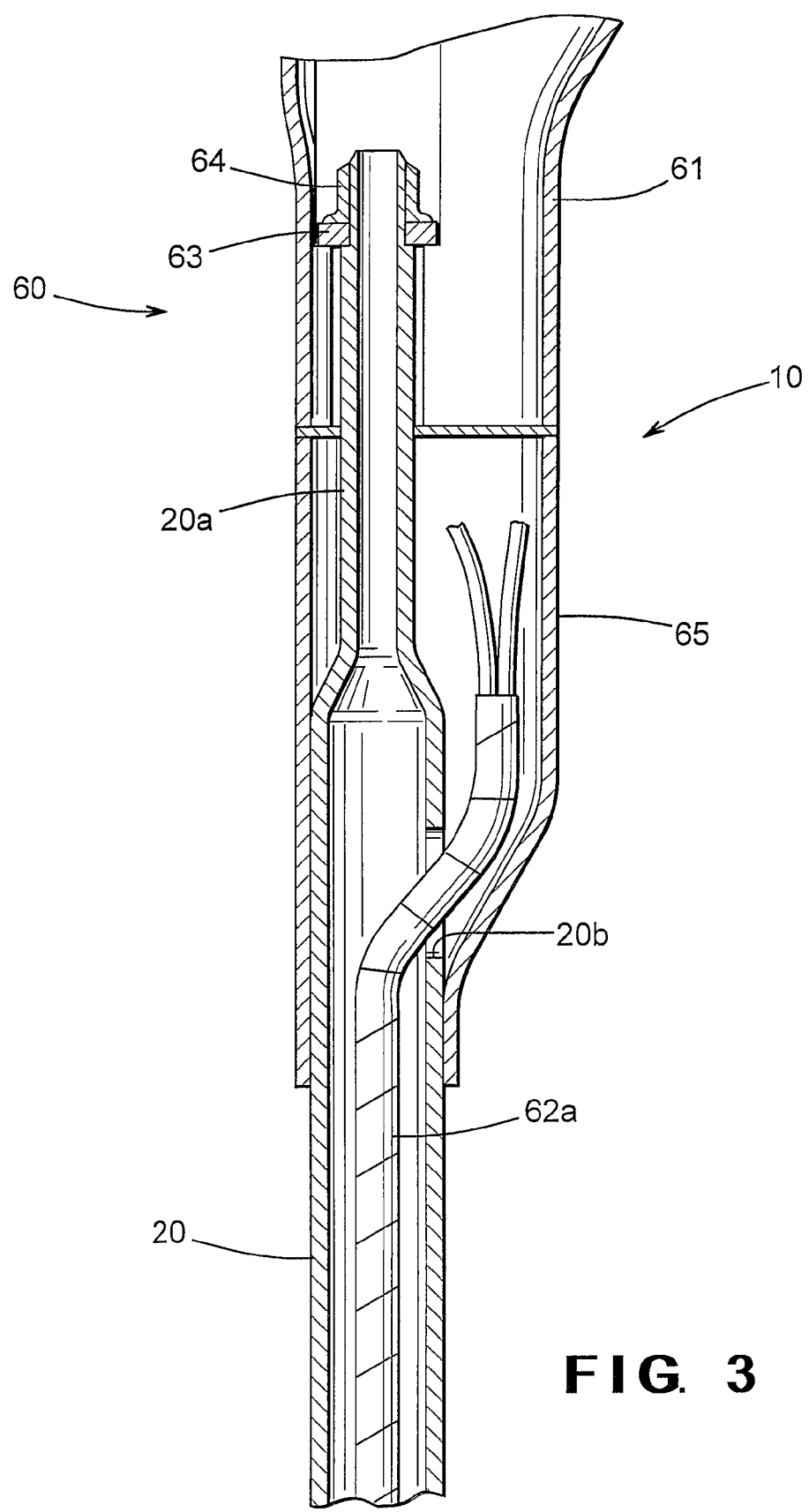
FIG. 3 is an enlarged sectional view of an upper end of the shift lever assembly illustrated in FIG. 1.

The upper end of the shift lever 20 is illustrated in detail in FIG. 3. As shown therein, a shift knob, indicated generally at 60, is supported on the upper end of the shift lever 20. The shift knob 60 is conventional in the art and includes a handle 61 having a manually operable switch 62 supported thereon. The handle 61 of the shift knob 60 can be secured to an upper portion 20a of the upper end of the shift lever 20 in any desired manner for movement therewith. For example, in the illustrated embodiment, the handle 61 of the shift knob 60 is secured to the upper portion 20a of the shift lever 20 by means of a washer 63 and a nut 64 that is threaded onto a threaded end portion of the upper portion 20a of the shift lever 20. If desired, a conventional protective boot 65 may extend between the shift knob 60 and the upper portion 20a of the shift lever 20. The upper portion 20a of the shift lever 20 is connected to the lower end of the boot 65, while the lower end of the shift knob 60 is connected to the upper end of the boot 65. The boot 65 may be formed from an elastomeric or any other desired material.

The switch 62 is conventional in the art and may, for example, be embodied as any known electrical, pneumatic, or other type switch that is intended to be manually manipulated by an operator of the vehicle to control an operation within or near the transmission 11. To accomplish this, one or more lines 62a extend from the switch 62 to the transmission 11. As shown in FIG. 3, such lines 62a extend downwardly from the switch 62 through an opening 20b formed through the upper end of the shift lever 20 and into the interior of the shift lever 20. The lines 62a extend further downwardly through the interior of the shift lever 20 to the lower end thereof, exiting through the opening 22 formed through the plug 21, as best shown in FIG. 2. Thus, it can be seen that the lines 62a extending from the switch 62 to the transmission 11 are protectively covered by the shift lever 20 and are effectively concealed from view.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A shift lever assembly that is adapted to be connected to a manually operable transmission including an input shaft, an output shaft, a plurality of gears selectively engagable with the input shaft and the output shaft to provide a plurality of speed reduction gear ratios therebetween, and a control member that is manually movable throughout a plurality of gear ratio positions for engaging a desired one of the plurality of speed reduction ratios, the shift lever assembly comprising:
   a hollow shift lever including a first end, a second end, and a hollow interior that extends from the first end to the second end;
   a shift knob supported on the first end of the hollow shift lever;
   a switch supported on the shift knob;
   an electric or pneumatic line extending from the switch through the shift knob, the first end of the hollow shift lever, the hollow interior of the hollow shift lever, the second end of the hollow shift lever, and outwardly from the second end of the hollow shift lever; and
   a noise and vibration damper assembly including a hollow housing that is connected to the second end of the hollow shift lever and a damper mechanism supported within the hollow housing, wherein the damper mechanism is adapted to be connected to a control member of a manually operable transmission.

2. The shift lever assembly defined in claim 1 wherein the switch is an electrical switch and the line is an electrical line.

3. The shift lever assembly defined in claim 1 wherein the switch is a pneumatic switch and the line is a pneumatic line.

4. The shift lever assembly defined in claim 1 wherein the second end of the hollow shift lever has an outer surface, and wherein the hollow housing of the noise and vibration damper assembly is connected to the outer surface of the second end of the hollow shift lever.

5. The shift lever assembly defined in claim 1 wherein the damper mechanism is axially offset from the hollow shift lever.

6. The shift lever assembly defined in claim 1 wherein the hollow shift lever defines a first axis and the damper mechanism defines a second axis that is parallel to and offset from the first axis.

7. The shift lever assembly defined in claim 1 wherein the damper mechanism includes an outer sleeve that is connected to the hollow housing of the noise and vibration damper assembly, an inner sleeve that is adapted to be connected to a control member of a manually operable transmission, and an annular layer of a noise and vibration absorbing material that extends between the outer sleeve and the inner sleeve.

8. The shift lever assembly defined in claim 7 wherein the annular layer of the noise and vibration absorbing material is formed from an elastomeric material.

9. The shift lever assembly defined in claim 1 wherein the second end of the hollow shift lever is closed by a plug.

10. The shift lever assembly defined in claim 9 wherein the plug has an opening formed therethrough, and wherein the line extends from the switch through the hollow shift lever and through the opening formed through the plug.

11. A combined manually operable transmission and shift lever assembly comprising:
    a manually operable transmission including an input shaft, an output shaft, a plurality of gears selectively engagable with the input shaft and the output shaft to provide a plurality of speed reduction gear ratios therebetween, and a control member that is manually movable throughout a plurality of gear ratio positions for engaging a desired one of the plurality of speed reduction ratios, the shift lever assembly comprising:
    a hollow shift lever including a first end, a second end, and a hollow interior that extends from the first end to the second end;
    a shift knob supported on the first end of the hollow shift lever;
    a switch supported on the shift knob;
    an electric or pneumatic line extending from the switch through the shift knob, the first end of the hollow shift lever, the hollow interior of the hollow shift lever, the second end of the hollow shift lever, and outwardly from the second end of the hollow shift lever; and
    a noise and vibration damper assembly including a hollow housing that is connected to the second end of the hollow shift lever and a damper mechanism supported within the hollow housing, wherein the damper mechanism is connected to a control member of a manually operable transmission.

12. The shift lever assembly defined in claim 11 wherein the switch is an electrical switch and the line is an electrical line.

13. The shift lever assembly defined in claim 11 wherein the switch is a pneumatic switch and the line is a pneumatic line.

14. The shift lever assembly defined in claim 11 wherein the second end of the hollow shift lever has an outer surface, and wherein the hollow housing of the noise and vibration damper assembly is connected to the outer surface of the second end of the hollow shift lever.

15. The shift lever assembly defined in claim 11 wherein the damper mechanism is axially offset from the hollow shift lever.

16. The shift lever assembly defined in claim 11 wherein the hollow shift lever defines a first axis and the damper mechanism defines a second axis that is parallel to and offset from the first axis.

17. The shift lever assembly defined in claim 11 wherein the damper mechanism includes an outer sleeve that is connected to the hollow housing of the noise and vibration damper assembly, an inner sleeve that is connected to the control member of the manually operable transmission, and an annular layer of a noise and vibration absorbing material that extends between the outer sleeve and the inner sleeve.

18. The shift lever assembly defined in claim 17 wherein the annular layer of the noise and vibration absorbing material is formed from an elastomeric material.

19. The shift lever assembly defined in claim 11 wherein the second end of the hollow shift lever is closed by a plug.

20. The shift lever assembly defined in claim 19 wherein the plug has an opening formed therethrough, and wherein the line extends from the switch through the hollow shift lever and through the opening formed through the plug.

* * * * *